US011731708B2

United States Patent
Ogawa et al.

(10) Patent No.: US 11,731,708 B2
(45) Date of Patent: Aug. 22, 2023

(54) FACILITY, PROVISION METHOD, AND PROVISION SYSTEM

(71) Applicant: TOYOTA JIDOSHA KABUSHIKI KAISHA, Toyota (JP)

(72) Inventors: Toshinari Ogawa, Nagoya (JP); Kohta Tarao, Nagoya (JP); Shinya Kijima, Nagoya (JP); Osamu Fukawatase, Miyoshi (JP); Koji Yasui, Toyota (JP); Toshiyuki Kobayashi, Miyoshi (JP); Hitomi Nakatani, Toyota (JP); Kuniaki Jinnai, Nagoya (JP); Nobuki Hayashi, Nisshin (JP); Masahiro Nagano, Toyota (JP); Akihiro Ito, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 370 days.

(21) Appl. No.: 17/096,342

(22) Filed: Nov. 12, 2020

(65) Prior Publication Data

US 2021/0163083 A1     Jun. 3, 2021

(30) Foreign Application Priority Data

Dec. 2, 2019 (JP) ................................. 2019-217886

(51) Int. Cl.
    *B62D 33/077*     (2006.01)
    *B62D 63/02*      (2006.01)
    *G05D 1/00*       (2006.01)
(52) U.S. Cl.
    CPC ......... *B62D 33/077* (2013.01); *B62D 63/025* (2013.01); *G05D 1/0088* (2013.01)

(58) Field of Classification Search
    CPC .... B62D 33/077; B62D 63/025; B62D 63/04; B62D 24/00; G05D 1/0088; B60P 3/32; B60P 3/34; B60P 3/36; B60P 3/341; E04H 6/02; E04H 1/1205; E04H 1/1222; E04H 6/18; E04H 3/02
    USPC .................................................. 296/193.04
    See application file for complete search history.

(56) References Cited

U.S. PATENT DOCUMENTS

| 3,719,244 | A  | * | 3/1973 | Miller ...................... B60P 3/32 |
|           |    |   |        | D12/100 |
| 5,445,236 | A  | * | 8/1995 | Kuhn ........................ B60P 3/32 |
|           |    |   |        | 180/209 |
| 9,254,774 | B1 | * | 2/2016 | Wolford .................... B60P 3/34 |
| 10,545,509| B1 | * | 1/2020 | Jessen .................. B62D 63/025 |

(Continued)

FOREIGN PATENT DOCUMENTS

| CN | 107078513 A | 8/2017 |
| CN | 108749929 A | 11/2018 |
| CN | 208602610 U | 3/2019 |

(Continued)

*Primary Examiner* — Jason S Morrow
*Assistant Examiner* — Veronica M Shull
(74) *Attorney, Agent, or Firm* — Oblon, McClelland, Maier & Neustadt, L.L.P.

(57) ABSTRACT

A facility provides an infrastructure service to a vehicle including a first unit that includes a driving wheel and a second unit that has a vehicle cabin space and is separable from the first unit. The facility includes a connection unit that connects to the second unit and a provision unit that provides the infrastructure service to the second unit when the connection unit is connected to the second unit.

8 Claims, 10 Drawing Sheets

(56) References Cited

U.S. PATENT DOCUMENTS

2013/0241236 A1* 9/2013 Vitale .................. B62D 47/003
296/193.04
2022/0281544 A1* 9/2022 Reinauer ................ B62D 65/04

FOREIGN PATENT DOCUMENTS

| JP | 2004-318443 A | 11/2004 |
| JP | 2013-113070 A | 6/2013 |
| WO | WO 01/12922 A1 | 2/2001 |
| WO | WO2018/230720 A1 | 12/2018 |

* cited by examiner

| | | |
|---|---|---|
| TRAVELING UNIT 20 | 0:00 TO 6:00 | VEHICLE CABIN UNIT 30 |
| | 6:00 TO 12:00 | VEHICLE CABIN UNIT 30 |
| | 12:00 TO 18:00 | |
| | 18:00 TO 24:00 | VEHICLE CABIN UNIT 30A |
| | NEXT DAY 0:00 TO 6:00 | |
| | NEXT DAY 6:00 TO 12:00 | |
| | NEXT DAY 12:00 TO 18:00 | VEHICLE CABIN UNIT 30 |
| | NEXT DAY 18:00 TO 24:00 | |
| | . . . | |
| TRAVELING UNIT 20A | 0:00 TO 6:00 | |
| | 6:00 TO 12:00 | VEHICLE CABIN UNIT 30A |
| | 12:00 TO 18:00 | VEHICLE CABIN UNIT 30A |
| | 18:00 TO 24:00 | |
| | NEXT DAY 0:00 TO 6:00 | |
| | NEXT DAY 6:00 TO 12:00 | |
| | NEXT DAY 12:00 TO 18:00 | VEHICLE CABIN UNIT 30B |
| | NEXT DAY 18:00 TO 24:00 | VEHICLE CABIN UNIT 30C |
| | . . . | |

FACILITY, PROVISION METHOD, AND PROVISION SYSTEM

CROSS-REFERENCE TO RELATED APPLICATION

This application claims priority to Japanese Patent Application No. 2019-217886 filed on Dec. 2, 2019, incorporated herein by reference in its entirety.

BACKGROUND

1. Technical Field

The present disclosure relates to a facility, a provision method, and a provision system.

2. Description of Related Art

An autonomous driving vehicle including a traveling unit without a vehicle cabin and a structure detachably attached to an upper portion of the traveling unit is disclosed (for example, refer to WO 2018/230720).

SUMMARY

One aspect of the disclosure is intended to, in a case where the vehicle is provided with a vehicle cabin unit having an infrastructure facility, enhance the vehicle cabin unit as a living space and use the traveling unit separated from the vehicle cabin unit.

A first aspect of the present disclosure is a facility that provides an infrastructure service to a vehicle. The vehicle includes a first unit that includes a driving wheel and a second unit that has a cabin space of the vehicle and is separable from the first unit. The facility includes a connection unit that connects to the second unit, and a provision unit that provides the infrastructure service to the second unit when the connection unit is connected to the second unit.

A second aspect of the present disclosure is a provision method of providing an infrastructure service to a vehicle. The vehicle includes a first unit that includes a driving wheel and a second unit that has a cabin space of the vehicle and is separable from the first unit. The provision method includes a step of accepting, by a computer, a request, from the vehicle, for using the infrastructure service, and a step of providing, by the computer, the infrastructure service to the second unit when a connection unit of a facility that provides the infrastructure service is connected to the second unit.

A third aspect of the present disclosure is a provision system including a vehicle and a facility that provides an infrastructure service to the vehicle. The vehicle includes a first unit that includes a driving wheel and a second unit that has a cabin space of the vehicle and is separable from the first unit. The facility includes a connection unit that connects to the second unit, and a provision unit that provides the infrastructure service to the second unit when the connection unit is connected to the second unit.

With the present disclosure, it is possible to, in a case where the vehicle is provided with a vehicle cabin unit having an infrastructure facility, enhance the vehicle cabin unit as a living space and use the traveling unit separated from the vehicle cabin unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 shows one example of a shared table;

DETAILED DESCRIPTION OF EMBODIMENTS

The infrastructure service provided by the facility according to the first aspect of the present disclosure is at least one infrastructure service from among a service using electric power, a service using gas, a service using tap water, and a service dealing with sewage, which includes infrastructure services used for living in places where people reside.

According to the facility as described above, the infrastructure service is continuously available in the second unit by connecting the second unit and the connection unit. Therefore, the second unit is enhanced as a living space. Further, since the first unit and the second unit can be separated, the first unit can be separated from the second unit and used while the second unit is connected to the connection unit. In the detailed description, the traveling unit is exemplified as the first unit. Moreover, the vehicle cabin unit is exemplified as the second unit and the third unit.

First Embodiment

System Configuration

Figure 1:
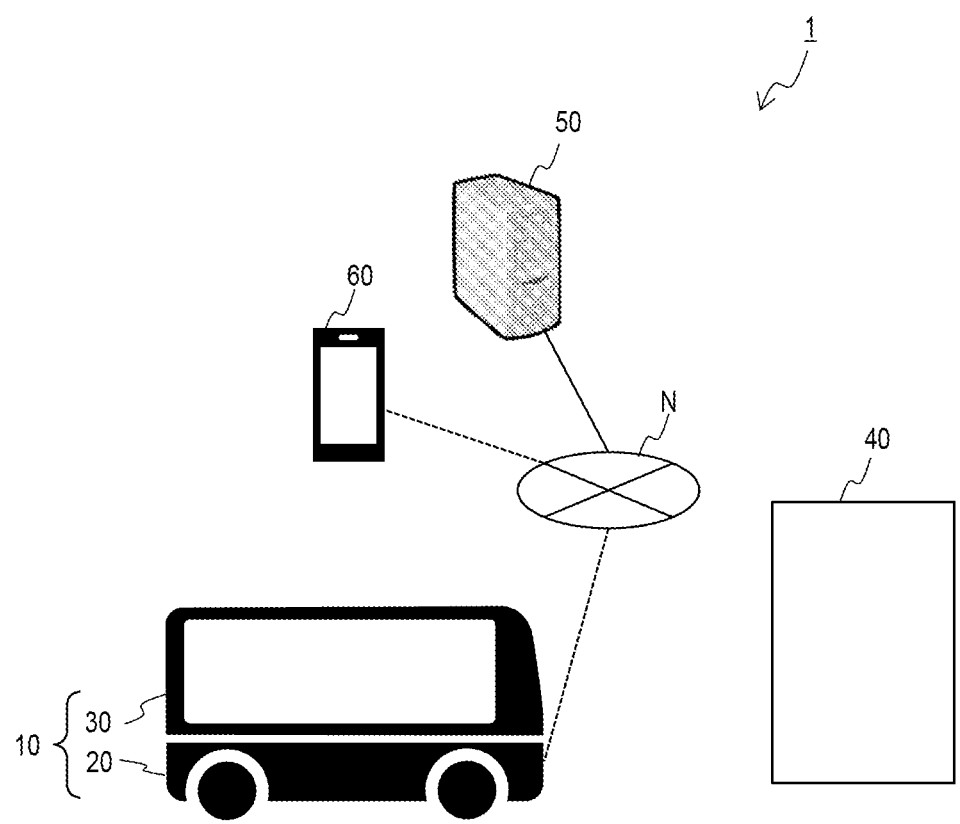
FIG. 1 shows one example of an outline of a configuration of a living space provision system according to a first embodiment.

FIG. 1 Shows one example of an outline of a configuration of a living space provision system 1 according to a first embodiment. The living space provision system 1 according to the present embodiment includes a vehicle 10, a residential section 40, an information processing apparatus 50, and an information terminal 60. In the detailed description, the residential section 40 and the information processing apparatus 50 are one of a plurality of examples of the "facility" of the present disclosure.

The vehicle 10 includes a traveling unit 20 capable of autonomous travel and a vehicle cabin unit 30. The traveling unit 20 and the vehicle cabin unit 30 can be separated and vertically coupled. That is, the traveling unit 20 can be shared among a plurality of vehicle cabin units 30. For example, the traveling unit 20 and the vehicle cabin unit 30 may be respectively provided with mechanisms capable of being separated and coupled, and those units can be separated and coupled. Further, the traveling unit 20 and the vehicle cabin unit 30 may be separated and coupled by using, for example the magnetic force of an electromagnet.

The residential section 40 includes a plurality of entrances 41 capable of receiving the vehicle 10 (details will be described later). In addition, the residential section 40 is provided with infrastructure facilities that use or treat electricity, gas, and water (including tap water and sewage). The infrastructure facilities are continuously available. Further, the infrastructure facilities are provided with connection mechanisms for supplying electricity, gas and water to the vehicle cabin unit 30 of the vehicle 10.

The information processing apparatus 50 manages a schedule in which the traveling unit 20 is shared among a plurality of vehicle cabin units 30.

The information terminal 60 may include, for example, a touchscreen display 61. The information terminal 60 receives, via the touchscreen display 61, inputs of a time when the user rides in the vehicle 10 so as to check in to the residential section 40 and a time when the user checks out from the residential section 40. In this detailed description, "check in" indicates a procedure for the user to receive the service provided by the living space provision system 1. Meanwhile, "check out" indicates a procedure by which the user ends the service provided by the living space provision system 1.

In the living space provision system 1 according to the first embodiment, the traveling unit 20, the information processing apparatus 50, and the information terminal 60 are mutually connected by a network (N). The network may be, for example, a worldwide public communication network such as the Internet or the like, or a wide area network (WAN) or another communication network. The network may include a telephone communication network such as a mobile phone or the like, and a wireless communication network such as WiFi® or the like.

Components of Each Unit

Traveling Unit 20

Figure 2:
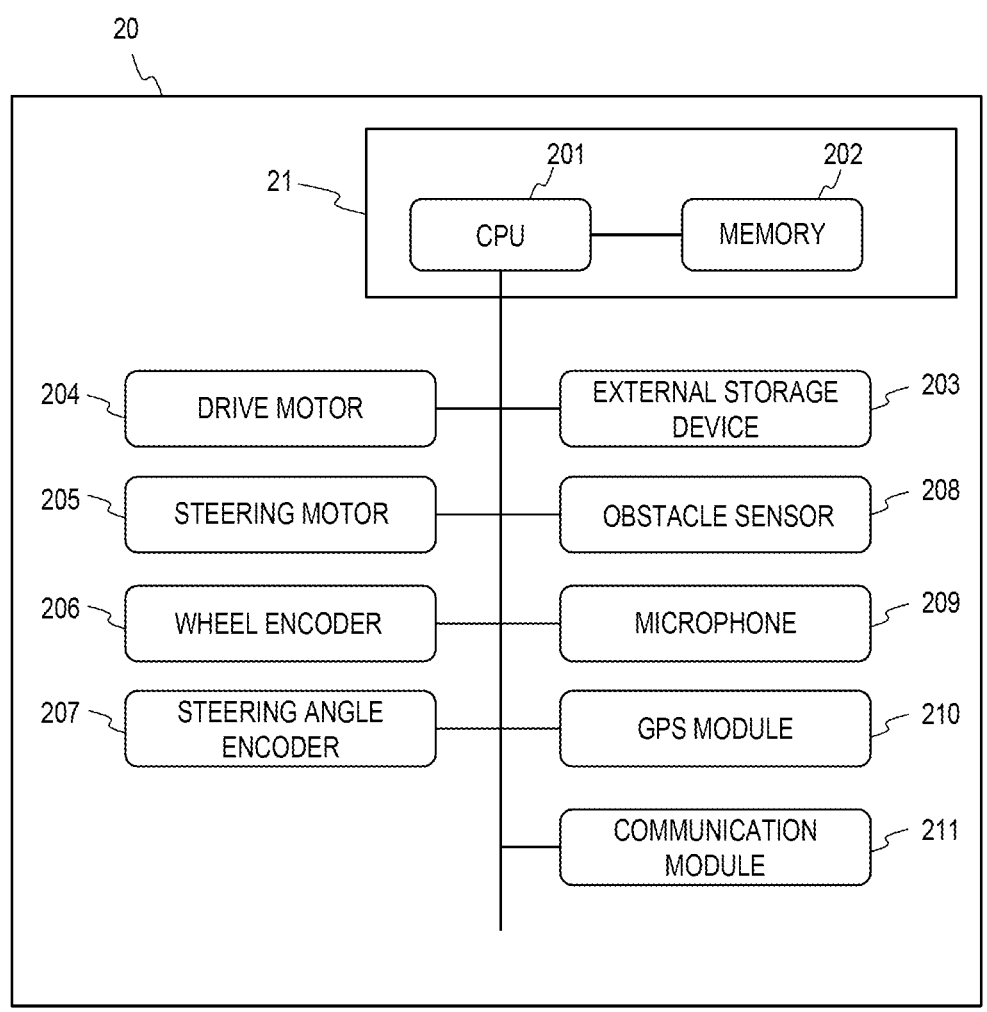
FIG. 2 is a diagram illustrating one example of a hardware configuration of a traveling unit.

FIG. 2 is a diagram illustrating one example of a hardware configuration of the traveling unit 20. The traveling unit 20 includes a central processing unit (CPU) 201, an electronic control unit (ECU) 21 having a memory 202, and an external storage device 203. The traveling unit 20 also includes a drive motor 204, a steering motor 205, a wheel encoder 206, and a steering angle encoder 207. The traveling unit 20 also includes an obstacle sensor 208 and a microphone 209. Further, the traveling unit 20 includes a Global Positioning System (GPS) module 210 and a communication module 211.

Each function described below is implemented by the CPU 201 executing a computer program that is executably expanded in the memory 202. The memory 202 stores a computer program executed by the CPU 201, data processed by the CPU 201, and the like. The memo 202 may be, for example, a dynamic random access memory (DRAM), a static random access memory (SRAM), a read-only memory (ROM), or the like. The external storage device 203 may be, for example, a non-volatile storage device such as a solid state drive (SSD) or a hard disk drive.

The drive motor 204 rotates each wheel included in the traveling unit 20. The drive motor 204 may drive any one pair of the two pairs of wheels, i.e. front and rear wheels. Further, the steering motor 205 outputs power for changing a direction along a rotation axis of at least one pair of wheels in order to steer the vehicle 10.

The wheel encoder 206 outputs a rotation angle of the wheel at a predetermined detection time interval. Further, the steering angle encoder 207 detects a steering angle at a predetermined detection time interval.

The obstacle sensor 208 includes an ultrasonic sensor or a radar. The obstacle sensor 208 may emit, for example, ultrasonic waves or electromagnetic waves in a detection target direction, and may detect, for example, presence, location and relative velocity of an obstacle in the detection target direction by using a difference between the emitted wave and the received reflected wave. Examples of the obstacle include pedestrians, bicycles, structures and buildings. An installation position of the obstacle sensor 208 may be, for example, in the area surrounding of four corners on the front, rear, left and right sides of the traveling unit 20, with a traveling direction of the traveling unit 20 as a front direction. The microphone 209 converts voice into an electric signal.

The GPS module 210 outputs information about a current location by receiving radio waves of time signals from a plurality of satellites that orbit the earth. Further, the communication module 211 is a module capable of performing wireless communication by a wireless signal and a wireless communication protocol according to a predetermined wireless communication standard.

Vehicle Cabin Unit 30

Figure 3:
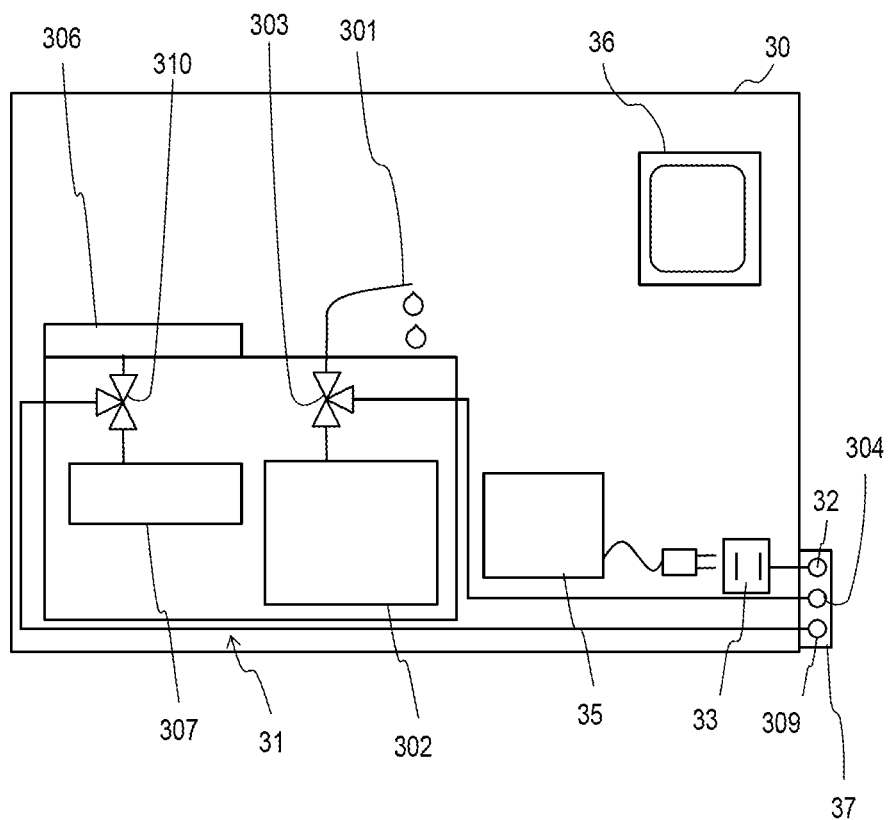
FIG. 3 is a diagram illustrating one example of a specification of a vehicle cabin unit.

FIG. 3 is a diagram illustrating one example of a specification of the vehicle cabin unit 30. The vehicle cabin unit 30 includes a kitchen unit 31. The kitchen unit 31 includes a faucet 301 through which tap water flows out, and a tank 302 that stores the tap water. Further, the vehicle cabin unit 30 is provided with a three-way valve 303. The faucet 301 and the tank 302 are connected via the three-way valve 303. A water inlet 304 through which the tap water can flow from an external facility is provided on an outer wall of the vehicle cabin unit 30. The water inlet 304 and one inlet forming the three-way valve 303 are connected via a water pipe. The degree of opening of the three-way valve 303 is controlled such that the tap water flows from the tank 302 to the faucet 301 when the water inlet 304 is not connected to the external facility.

Further, the kitchen unit 31 is provided with a stove 306, and a gas cylinder 307 that supplies gas to the stove 306. Further, the vehicle cabin unit 30 is provided with a three-way valve 310. The stove 306 and the gas cylinder 307 are connected via the three-way valve 310. A gas inlet 309 through which the gas can flow from the external facility is provided on the outer wall of the vehicle cabin unit 30. The gas inlet 309 and one inlet of the three-way valve 310 are connected via a gas pipe. The degree of opening of the three-way valve 310 is controlled such that the gas flows from the gas cylinder 307 to the stove 306 when the gas inlet 309 is not connected to the external facility.

In addition, the outer wall of the vehicle cabin unit 30 is provided with a connector 32 that is connected to a connector provided in a facility that supplies power from the outside and that conducts electricity. Further, an outlet 33 is provided on an inner wall of the vehicle cabin unit 30. The connector 32 and the outlet 33 are connected via an electric wiring. Further, a portable air conditioner 35 having a built-in battery is provided inside the room. The air conditioner 35 has a plug, and power can be harvested by inserting the plug into the outlet 33.

Moreover, an operation panel 36 is provided on the inner wall of the vehicle cabin unit 30. The operation panel 36 includes a computer having a processor such as a CPU, a main storage device such as a RAM and a ROM, an EPROM, and an auxiliary storage device such as a hard disk drive, and a touchscreen display. When the vehicle cabin unit 30 and the external facility are connected, a section for selecting whether or not to supply the tap water and the gas from the external facility is displayed via the computer on the touchscreen display. For example, when it is selected to supply the tap water from the outside, the degree of opening of the three-way valve 303 is controlled via the computer such that the tap water flows from the water inlet 304 to the faucet 301 after the external facility is connected. Similarly, for example, when it is selected to supply the gas from the outside, the degree of opening of the three-way valve 310 is controlled via the computer such that the gas flows from the gas inlet 309 to the stove 306 after the external facility is connected. The operation panel 36 may be provided in the residential section 40. The operation panel 36 may be operated in the same manner as above to control the supply of the tap water or the gas to the vehicle cabin unit 30. Additionally, the three-way valve 303 and the three-way valve 310 may be provided in the middle of the pipe installed in the residential section 40 to control the supply of the tap water or the gas to the vehicle cabin unit 30.

Further, the water inlet 304, the gas inlet 309, and the connector 32 are collectively provided at one location on the outer wall of the vehicle cabin unit 30, and such a location will be referred to as a connection unit 37 hereinafter. The connection unit 37 is one example of a connection mechanism.

Residential Section 40

Figure 4:
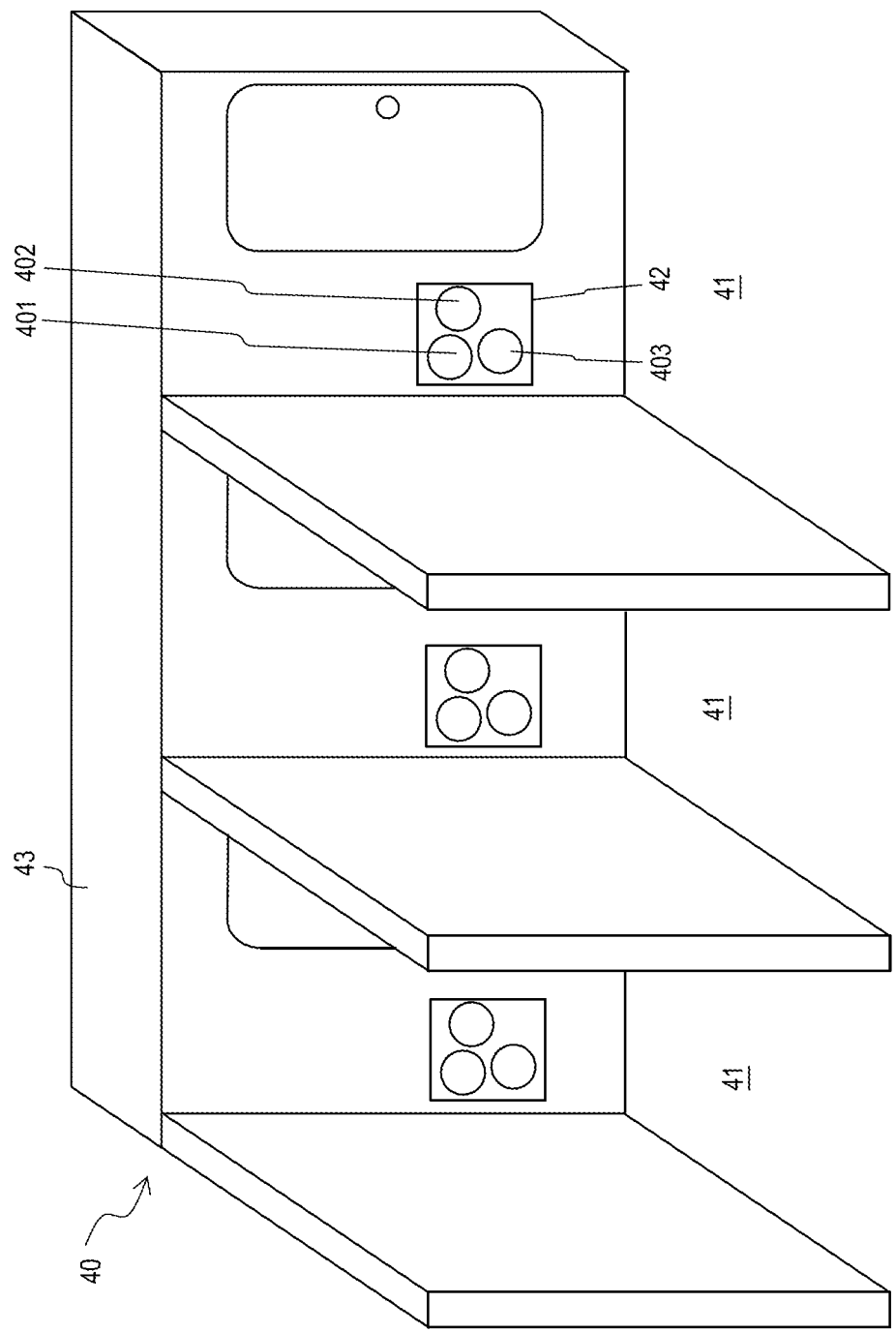
FIG. 4 is a diagram illustrating one example of a specification of a residential section.

FIG. 4 is a diagram illustrating one example of a specification of the residential section 40. The plurality of entrances 41 of the residential section 40 is arranged side by side in a horizontal direction. A connector 401, a gas supply port 402, and a water supply port 403 are collectively provided as a connection unit 42 on an outer wall of the entrance 41. A door is provided at each of the entrances 41. The user can enter the inside of the residential section 40 by alighting from the vehicle cabin unit 30 and opening the door. A shared space is provided inside the residential section 40. Facilities such as a table, shower and toilet are installed in the shared space. In addition, the residential section 40 is provided with a passage 43 through which the user can visit the shared space from the vehicle cabin unit 30. The passage 43 is provided such that the user can come and go between the plurality of entrances 41. The connector 401, the gas supply port 402, and the water supply port 403 are collectively configured to be one example of the "connection unit" of the present disclosure.

Functional Configuration of Each Unit

Figure 5:
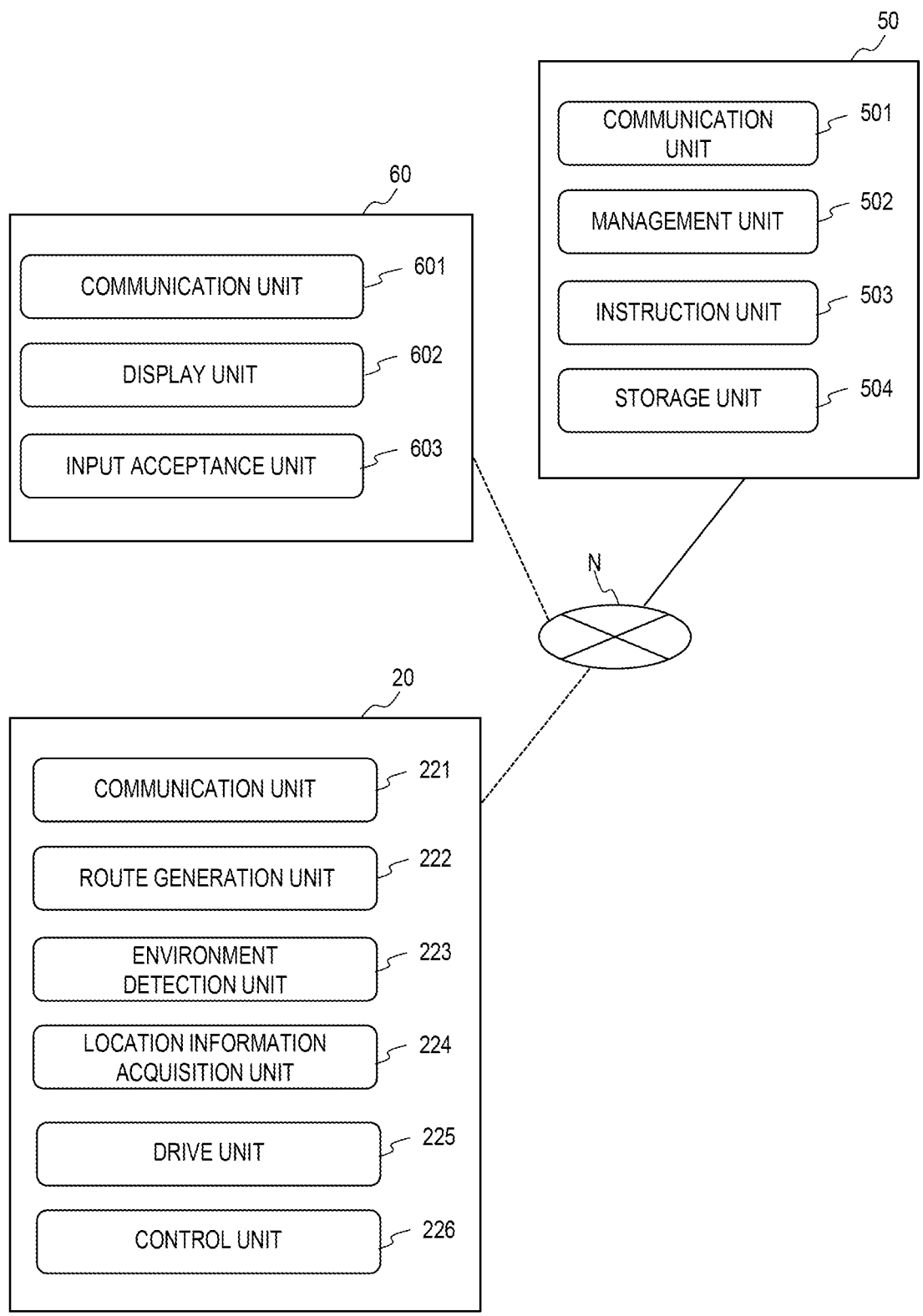
FIG. 5 shows one example of an outline of functional configurations of the traveling unit, an information processing apparatus, and an information terminal, which constitute the living space provision system.

FIG. 5 shows one example of an outline of functional configurations of the traveling unit 20, the information processing apparatus 50, and the information terminal 60, which constitute the living space provision system 1.

Traveling Unit 20

The traveling unit 20 includes a communication unit 221. The communication unit 221 is formed so as to include the communication module 211. The communication unit 221 may be connected to, for example, a WiFi access point or as mobile phone base station, and communicates information with various servers on the network through a WAN connected thereto.

The traveling unit 20 also includes a route generation unit 222. The route generation unit 222 generates a route from the current location to a target location. A method for generating the route may be a known method or a method using a unique algorithm. The route is formed as a target trajectory including latitude and longitude.

The traveling unit 20 also includes an environment detection unit 223. The environment detection unit 223 is formed so as to include the obstacle sensor 208 and the microphone 209. The environment detection unit 223 detects various pieces of information from the environment on the surroundings of the vehicle 10 during traveling. More specifically, the environment detection unit 223 determines whether there is an obstacle on the surroundings of the vehicle 10 based on the output from the obstacle sensor 208, and then outputs the determination information. In addition, the environment detection unit 223 determines whether or not the output from the microphone 209 is equal to or higher than a predetermined threshold and whether or not the output from the microphone 209 is a voice of a person. Then, in a case where it is determined that the output from the microphone 209 is equal to or higher than the threshold and is a voice of a person, the environment detection unit 223 determines that there is a person on the surroundings of the vehicle 10. The environment detection unit 223 outputs the determination information. Whether or not the output from the microphone 209 is a voice of a person is determined by analyzing a frequency spectrum of the signal output from the microphone 209, or by voice recognition.

The traveling unit 20 also includes a location information acquisition unit 224. The location information acquisition unit 224 is formed so as to include the GPS module 210. The location information acquisition unit 224 acquires information on the current location of the vehicle 10 from the output of the GPS module 210.

The traveling unit 20 also includes a drive unit 225. The drive unit 225 is formed so as to include the drive motor 204, the steering motor 205, the wheel encoder 206, and the steering angle encoder 207. The drive unit 225 receives a control signal for driving the drive motor 204 and the steering motor 205. Then, the drive motor 204 and the steering motor 205 are controlled according to the received control signal. Further, the drive unit 225 outputs the steering angle of the vehicle 10 by the steering angle encoder 207 at a predetermined detection time interval. Moreover, the drive unit 225 outputs the rotation angle of the wheel via the wheel encoder 206 at a predetermined detection time interval.

The traveling unit 20 also includes a control unit 226. The control unit 226 is formed so as to include the ECU 212. The control unit 226 generates the control signal for driving the drive motor 204 and the steering motor 205. The control signal generated by the control unit 226 includes a signal such that the vehicle 10 follows a target trajectory. The control unit 226 also acquires steering angle information of the vehicle 10 and wheel rotation angle information. Then, the control unit 226 corrects the control signal such that the vehicle 10 follows the target trajectory according to the acquired steering angle information and the acquired wheel rotation angle information. The control unit 226 also receives information on the current location of the vehicle 10. The control signal is corrected such that the vehicle 10 follows the target trajectory according to the received information on the current location. The control unit 226 also receives environmental information on the surroundings of the vehicle 10. Then, the control unit 226 corrects the control signal according to the received environment information.

Information Processing Apparatus 50

The information processing apparatus 50 is a computer having a processor such as a CPU, a main storage device such as a RAM and a ROM, an auxiliary storage device such as an EPROM, a hard disk drive, and a removable medium. The removable medium may be, for example, a USB memory or a disk recording medium such as a CD or a DVD. An operating system (OS), various programs, various tables and the like are stored in the auxiliary storage device. The programs stored therein are loaded into a work area of the main storage device and executed, and each component is controlled by executing the programs. Thus, it is possible to implement each function so as to match a predetermined purpose as described later.

The information processing apparatus 30 includes a communication unit 501. The communication unit 501 is formed so as to include, for example, a communication module such as a network interface card (NIC) or a wireless circuit. The communication unit 501 connects to, for example, a WAN or a local area network (LAN) from a mobile phone base station or an access point of a wireless communication network such as WiFi® or the like, and further connects to the WAN via the LAN to communicate with various servers and information terminals on the network through the WAN.

The information processing apparatus 50 includes a management unit 502. The management unit 502 manages a shared schedule of the traveling units. FIG. 6 illustrates one example of a shared table T1 that the management unit 502 refers to for managing the shared schedule of the traveling units 20. As shown in FIG. 6, in the shared table T1, time zone information in which the traveling unit is used and information on the vehicle cabin unit to which the traveling unit is connected are associated with each traveling unit. In a case where the management unit 502 acquires information on a time zone in which the traveling unit is desired to be used (hereinafter referred to as "desired time zone"), the management unit 502 refers to the shared table T1 and allocates a traveling unit that can be rented out in the desired time zone. A method by which the management unit 502 allocates the traveling unit may be a known method or a method using a unique algorithm. Further, the management unit 502 reflects the allocated information in the shared table T1 and updates the shared table T1. Moreover, the management unit 502 determines whether or not there is a traveling unit allocated to the vehicle cabin unit by referring to the shared table T1.

The information processing apparatus 50 includes an instruction unit 503. The instruction unit 503 generates an instruction signal for instructing the traveling unit 20 to move. The instruction signal includes information on the target location. The instruction signal also includes an instruction signal to connect to the vehicle cabin unit at the target location.

The information processing apparatus 50 includes a storage unit 504. The storage unit 504 is formed so as to include a main storage device and an auxiliary storage device. A program executed by a processor and data used by the control program are expanded in the main storage device. Further, the auxiliary storage device stores a program executed by the processor and data used by the program. The auxiliary storage device may store an operating system for executing the program. Each function is implemented by loading the program stored in the auxiliary storage device into the main storage device and executing the program by the processor. The storage unit 504 also stores information shown in the shared table T1 described above in the main storage device or the auxiliary storage device.

Information Terminal 60

The information terminal 60 is a computer having a processor such as a CPU, a main storage devices such as a RAM and a ROM, an auxiliary storage device such as an EPROM, a hard disk drive, and a removable medium, as well as the touchscreen display 61. An operating system (OS), various programs, various tables and the like are stored in the auxiliary storage device. The programs stored therein are loaded into a work area of the main storage device and executed, and each component is controlled by executing the programs. Thus, it is possible to implement each function so as to match a predetermined purpose as described later.

The information terminal 60 includes a communication unit 601. The communication unit 601 is formed so as to include a communication module. The communication unit 601 may be connected to, for example, the WiFi® access point or the mobile phone base station, and communicates information with various servers on the network through the WAN connected to them.

The information terminal 60 also includes a display unit 602. The display unit 602 is formed so as to include the touchscreen display 61. The display unit 602 displays information on the touchscreen display 61.

The information terminal 60 also includes an input acceptance unit 603. The input acceptance unit 603 is formed so as to include the touchscreen display 61. The input acceptance unit 603 accepts input of information via the touchscreen display 61.

Processing Flow of Each Unit

Figure 7:
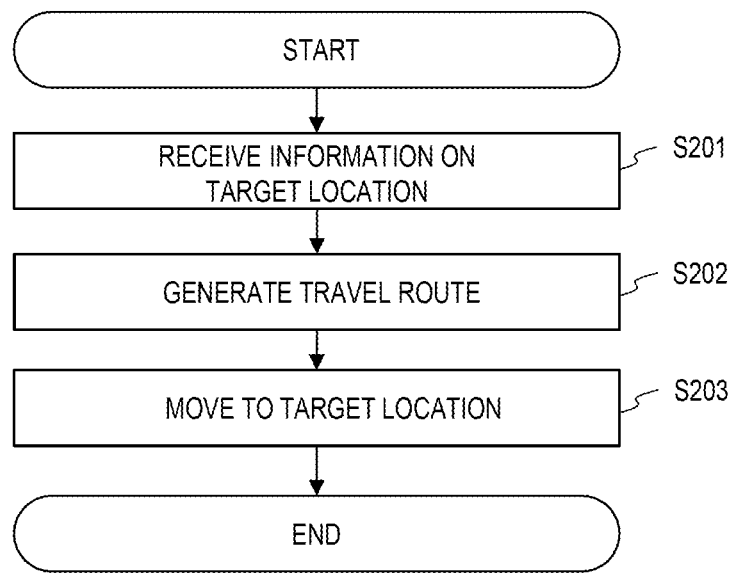
FIG. 7 shows one example of a flowchart of a processing in which the traveling unit moves to a target location.

Next, a processing flow executed by each unit will be described. FIG. 7 shows one example of a flowchart of a processing in which the traveling unit 20 moves to a target location.

(S201) In step S201, the communication unit 221 receives a signal including information on the target location from the external device.

(S202) In step S202, the location information acquisition unit 224 acquires information on the current location of the traveling unit 20. The route generation unit 222 uses the information on the current location and the information on the target location received in step S201 to generate a travel route from the current location to the target location.

(S203) In step S203, the control unit 226 generates a drive control signal for driving the wheels by using the travel route generated in step S202, and transmits the drive control signal to the drive unit 225. The drive unit 225 drives the driving wheels in accordance with the received drive control signal, such that the traveling unit 20 moves from the current location to a destination location. In addition, while the traveling unit 20 is moving to the destination location, the environment detection unit 223 acquires surrounding environment information. The control unit 226 generates the drive control signal according to the environmental information and transmits the signal to the drive unit 225. By executing such a processing, the traveling unit 20 moves to the destination location while correcting the initially planned travel route according to the environment.

Figure 8:
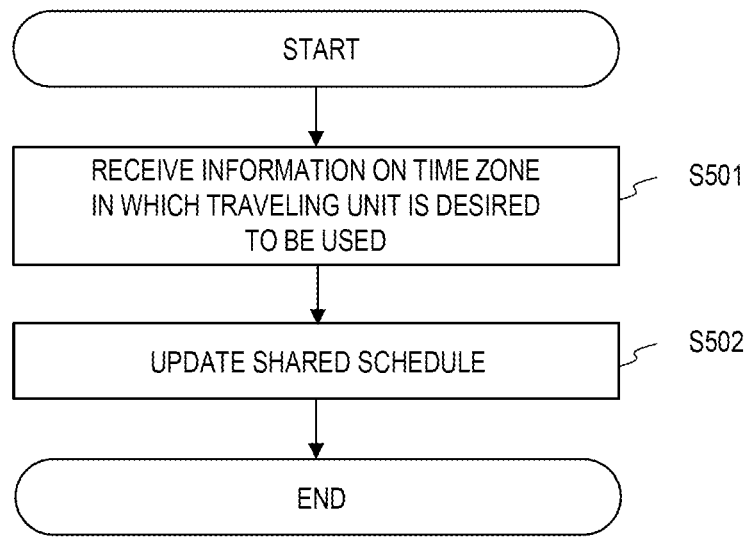
FIG. 8 shows one example of a flowchart in which the information processing apparatus manages a shared schedule of traveling units.

Further, FIG. 8 shows one example of a flowchart in which the information processing apparatus 50 manages the shared schedule of the traveling units 20.

(S501) In step S501, the communication unit 501 receives, from the external device, information on the time period in which the traveling unit is desired to be used.

(S502) In step S502, the management unit 502 allocates a traveling unit that can be rented out in the desired time zone referring to the information on the time period in which the traveling unit is desired to be used, which is received by the communication unit 501 in step S501, and the information shown in the shared table T1. Further, the management unit 502 reflects the allocated information in the shared table T1 and updates the shared table T1.

Figure 9:
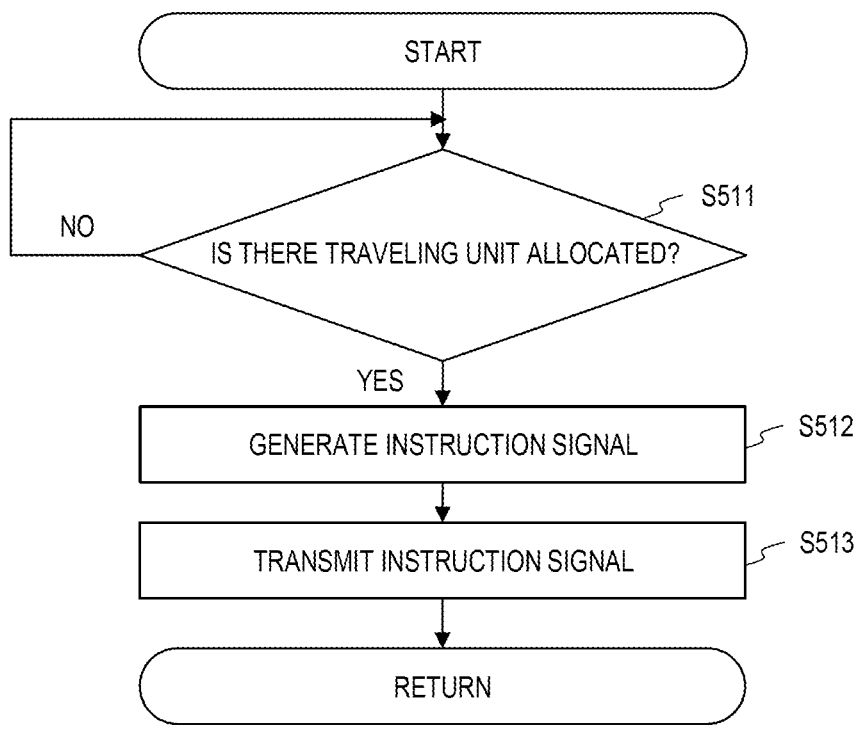
FIG. 9 shows one example of a flowchart of a processing in which the information processing apparatus issues an instruction to the traveling unit to move.

Further, FIG. 9 shows one example of a flowchart of a processing in which the information processing apparatus 50 issues the instruction to the traveling unit 20 to move.

(S511) In step S511, the management unit 502 determines whether or not there is a traveling unit allocated to the vehicle cabin unit after a predetermined time has elapsed, by referring to the shared table T1. The predetermined time may be, for example, a time required for the traveling unit to move from the current location to a location at where the allocated vehicle cabin unit is located in a case where it is determined that there is a traveling unit allocated to the vehicle cabin unit.

(S512) In step S512, the instruction unit 503 generates, in a case where it is determined that there is a traveling unit allocated to the vehicle cabin unit after the predetermined time has been elapsed in step S511, the instruction signal for such a traveling unit 20 to move to the location at where the allocated vehicle cabin unit 30 is located and to connect to the vehicle cabin unit 30. The instruction signal includes information on the target location that is the location at which the vehicle cabin unit 30 is located.

(S513) In step S513, the communication unit 501 transmits the instruct on signal generated in step S512 to the communication unit 221 of the traveling unit 20.

Figure 10:
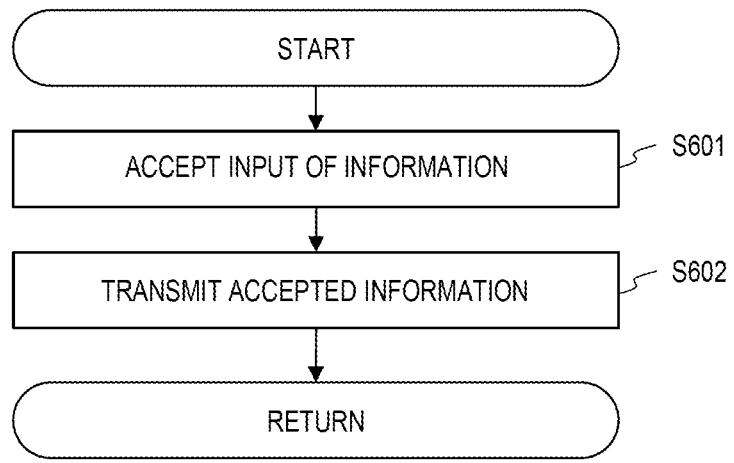
FIG. 10 shows one example of a flowchart of a processing in which the information terminal accepts an input of information.

Further, FIG. 10 shows one example of a flowchart of a processing in which the information terminal 60 accepts the input of the information.

(S601) In step S601, the input acceptance unit 603 accepts the input of the information. A display for prompting the input of the information may be displayed on the touch-screen display 61, by the display unit 602, in advance.

(S602) In step S602, the communication unit 601 transmits the information accepted in step S601 to the external device.

Processing Flow of Living Space Provision System 1

Figure 11:
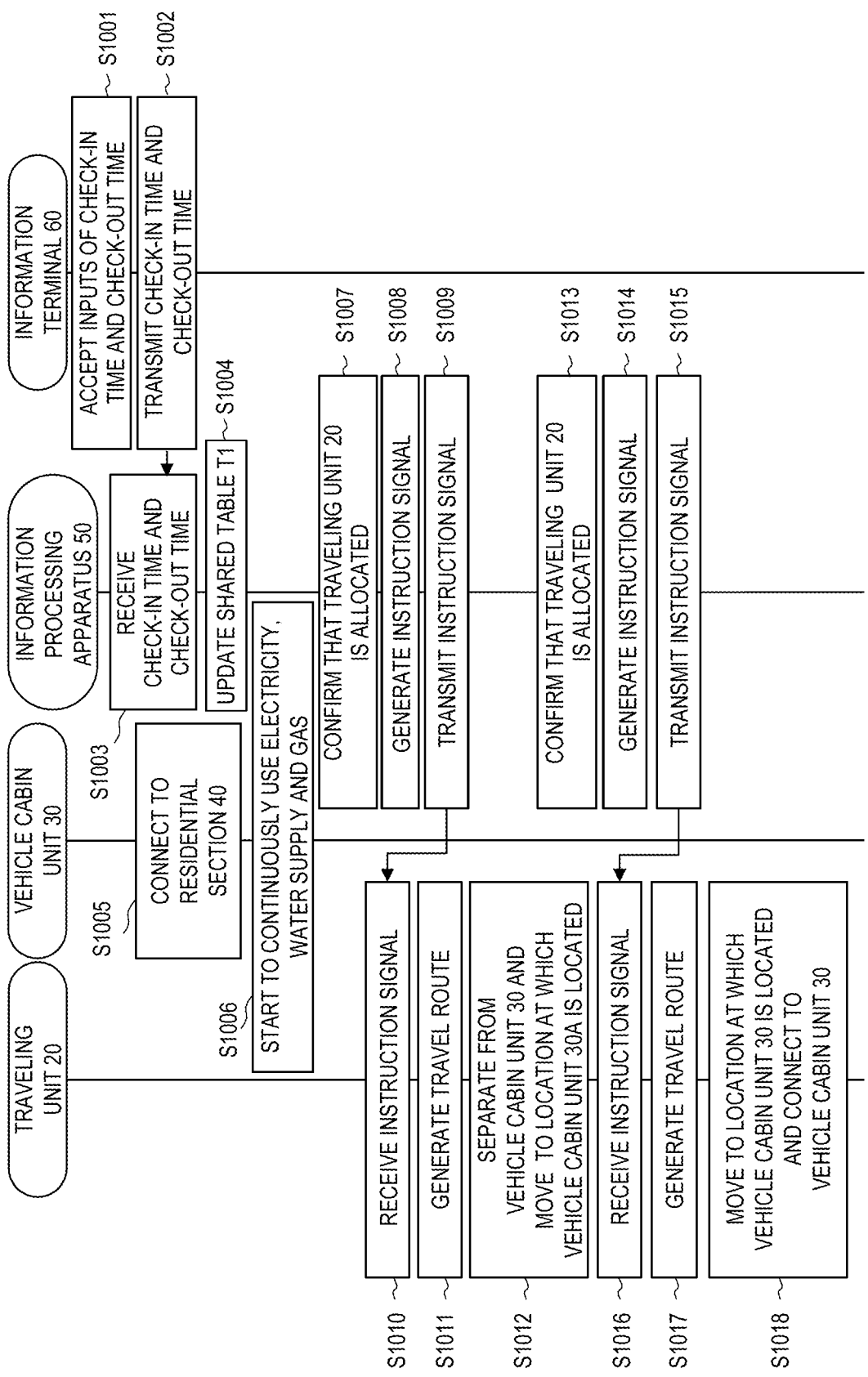
FIG. 11 shows one example of a flowchart of a processing executed by the entire living space provision system.

Next, one example of a processing implemented by the entire living space provision system 1 will be described. FIG. 11 shows one example of a flowchart of the processing executed by the entire living space provision system 1. It is assumed that a user means a person who rides in the vehicle 10 and checks in to the residential section 40.

(S1001) In step S1001, the input acceptance unit 603 of the information terminal 60 held by the user accepts the inputs of a check-in time for checking in to the residential section 40 and a check-out time for checking out from the residential section 40.

(S1002) In step S1002, the communication unit 601 transmits the information on the check-in time and the check-out time accepted in step S1001 to the information processing apparatus 50.

(S1003) In step S1003, the communication unit 501 of the information processing apparatus 50 receives the information on the check-in time and the check-out time, which is transmitted from the communication unit 601 of the information terminal 60.

(S1004) In step S1004, the management unit 502 updates schedule information stored in the shared table by using the information on the check-in time and check-out time, which is received by the communication unit 501 in step S1003. More specifically, the management unit 502 allocates the traveling unit 20 as, for example, a traveling unit to be coupled with the vehicle cabin unit 30 after the check-out time. Further, the management unit 502 allocates the traveling unit 20 to another vehicle cabin unit 30A that requires the traveling unit 20 during a period from the check-in time to the check-out time. The vehicle cabin unit 30A may be one that is checked in to the residential section 40, or one that is located in a place other than the residential section 40. The vehicle cabin unit 30A is one example of the "second unit" of the present disclosure, and in this case, the vehicle cabin unit 30 is one example of the "third unit" of the present disclosure. Further, step S1004 is one example of the "allocating" of the present disclosure.

(S1005) In step S1005, the vehicle 10 arrives at the entrance 41 of the residential section 40. Then, the connection unit 37 of the vehicle cabin unit 30 and the connection unit 42 of the residential section 40 are connected. More specifically, the water inlet 304 of the vehicle cabin unit 30 and the water supply port 403 of the residential section 40 are connected. Similarly, the gas inlet 309 of the vehicle cabin unit 30 and the gas supply port 402 of the residential section 40 are connected. Similarly, the connector 32 of the vehicle cabin unit 30 and the connector 401 of the residential section 40 are connected.

(S1006) In step S1006, the operation panel 36 provided in the vehicle cabin unit 30 accepts the input indicating that water and gas are continuously used (one example of the "accepting" and the "selecting" according to the present disclosure). The degree of opening of the three-way valve 303 provided in the middle of the water pipe is controlled such that the tap water supplied from the residential section 40 flows to the faucet 301 (one example of the "provision controlling" and the "providing" according to the present disclosure). Similarly, the degree of opening of the three-way valve 310 provided in the middle of the gas pipe is controlled such that the gas supplied from the residential section 40 flows to the stove 306 (one example of the "provision controlling" and the "providing" according to the present disclosure). In addition, the electricity is automatically supplied to the outlet 33 of the vehicle cabin unit 30 by connecting the connector 32 and the connector 401 (one example of the "providing" according to the present disclosure). By executing such a processing, the user can continue to use the electricity, the water, and the as in the vehicle cabin unit 30.

(S1007) In step S1007, the management unit 502 of the information processing apparatus 50 confirms that the traveling unit 20 connected to the vehicle cabin unit 30 is allocated to another vehicle cabin unit 30A in the shared table T1 by referring to the shared table T1.

(S1008) In step S1008, the instruction unit 503 generates an instruction signal for instructing the traveling unit 20 to move to the location at which the vehicle cabin unit 30A is located and to connect to the vehicle cabin unit 30A. The control signal includes information on the location at which the vehicle cabin unit 30A is located.

In step S1009, the communication unit 501 transmits the instruction signal generated in step S1008 to the communication unit 221 of the traveling unit 20.

(S1010) In step S1010, the communication unit 221 of the traveling unit 20 receives the instruction signal transmitted from the communication unit 501 of the information processing apparatus 50 in step S1009.

(S1011) step S1011, the location information acquisition unit 224 acquires information on the current location of the traveling unit 20. The route generation unit 222 uses the information on the current location and the information on the location at which the vehicle cabin unit 30A is located, included in the instruction signal received in step S1010, to generate a travel route from the current location to the location at which the vehicle cabin unit 30A is located.

(S1012) in step S1012, the control unit 226 generates a drive control signal for driving the wheels by using the travel route generated in step S1011, and transmits the drive control signal to the drive unit 225. The drive unit 225 drives the wheels in accordance with the received drive control signal, such that the traveling unit 20 moves from the current location to the location at which the vehicle cabin unit 30A is located. Further, in a case where the environment detection unit 223 acquires information on obstacles or persons on the surroundings of the vehicle 10 or on the travel route during the traveling unit 20 moving to the location at which the vehicle cabin unit 30A is located, the control unit 226 generates a drive control signal such that the traveling unit 20 temporarily avoids obstacles or persons and returns to the original travel route, and transmits the drive control signal to the drive unit 225. By executing such a processing, the traveling unit 20 moves to the location at which the vehicle cabin unit 30A is located while avoiding obstacles or persons. The traveling unit 20 is connected to the vehicle cabin unit 30A and moves to a desired location integrally with the vehicle cabin unit 30A.

(S1013) In step S1013, the instruction unit 503 of the information processing apparatus 50 confirms that the traveling unit 20 separated from the vehicle cabin unit 30 is allocated to the vehicle cabin unit 30 in the shared table T1 by referring to the shared table.

(S1014) In step S1014, the instruction unit 503 generates an instruction signal for instructing the traveling unit 20 to move to the location at which the vehicle cabin unit 30 is located and to connect to the vehicle cabin unit 30. The instruction signal includes information on the location at which the vehicle cabin unit 30 is located.

(S1015) In step S1015, the communication unit 501 transmits the instruction signal generated in step S1014 to the communication unit 221 of the traveling unit 20.

(S1016) In step S1016, the communication unit 221 of the traveling unit 20 receives the instruction signal transmitted from the communication unit 501 of the information processing apparatus 50 in step S1015.

(S1017) In step S1017, the location information acquisition unit 224 acquires information on the current location of the traveling unit 20. The route generation unit 222 uses the information on the current location and the information on the location at which the vehicle cabin unit 30 is located, included in the instruction signal received in step S1016, to generate a travel route from the current location to the location at which the vehicle cabin unit 30 is located.

(S1018) in step S1018, the control unit 226 generates a drive control signal for driving the wheels by using the travel route generated in step S1017, and transmits the drive control signal to the drive unit 225. The drive unit 225 drives the wheels in accordance with the received drive control signal, such that the traveling unit 20 moves from the current location to the location at which the vehicle cabin unit 30 is located. Further, in a case where the environment detection unit 223 acquires information on obstacles or persons on the surroundings of the vehicle 10 or on the travel route during the traveling unit 20 moving to the location at which the vehicle cabin unit 30 is located, the control unit 226 generates a drive control signal such that the traveling unit 20 temporarily avoids obstacles or persons and returns to the original travel route, and transmits the drive control signal to the drive unit 225. By executing such a processing, the traveling unit 20 moves to the location at which the vehicle cabin unit 30 is located while avoiding obstacles or persons. The traveling unit 20 is connected to the vehicle cabin unit 30 and is integrated with the vehicle cabin unit 30. By executing such a processing, the user can check out from the residential section 40 as scheduled.

Effect of First Embodiment

It is difficult to increase a size of the vehicle cabin unit 30 constituting the vehicle 10 that forms the living space provision system 1 due to restrictions such as road width. Therefore, it is difficult for the vehicle cabin unit 30 to provide the tank 302 or the gas cylinder 307 having a capacity of more than a predetermined capacity. In other words, the available amount of water is limited to the amount stored in the tank 302 in the vehicle cabin unit 30. Similarly, the available amount of gas is limited to the amount stored in the gas cylinder 307. Further, a size of the portable air conditioner 35 is limited to a size that can be accommodated in the vehicle cabin unit 30. Therefore, the portable air conditioner 35 can only use the power stored in the built-in battery.

However, according to the living space provision system 1 described above, in a case where the connection unit 42 of the residential section 40 and the connection unit 37 of the vehicle cabin unit 30 are connected, the electricity, the tap water and the gas are supplied from the residential section 40 to the vehicle cabin unit 30. Therefore, the electricity, the tap water and the gas are continuously available in the vehicle cabin unit 30. Therefore, the vehicle cabin unit 30 is enhanced as the living space.

Further, since it is difficult to increase the size of the vehicle cabin unit 30, a size of a space inside the vehicle cabin unit 30 is also limited. However, according to the living space provision system 1 described above, in a case where the connection unit 42 of the residential section 40 and the connection unit 37 of the vehicle cabin unit 30 are connected, the user can go from the vehicle cabin unit 30 to the shared space of the residential section 40 through the passage 43. Therefore, the user does not have to stay in the vehicle cabin unit 30 of which the size is limited. In addition, the user can continuously use the infrastructure facilities in the shared space. Moreover, the user can visit another vehicle cabin unit through the passage 43. Accordingly, according to the living space provision system 1 described above, the comfort of the user is increased.

Further, according to the living space provision system 1 described above, the user can select whether or not to continue to use at least one of the gas and tap water by operating the operation panel 36. Accordingly, the living space provision system 1 described above is a highly convenient system that can satisfy the demands of each user.

Further, according to the living, space provision system 1 described above, the traveling unit 20 is separated from the vehicle cabin unit 30 while the vehicle cabin unit 30 remains in the residential section 40, and is used for another vehicle cabin unit 30A. Accordingly, according to the living space provision system 1 described above, the traveling unit 20 that is separable from the vehicle cabin unit 30 can be further used.

Modified Example

Figure 12:
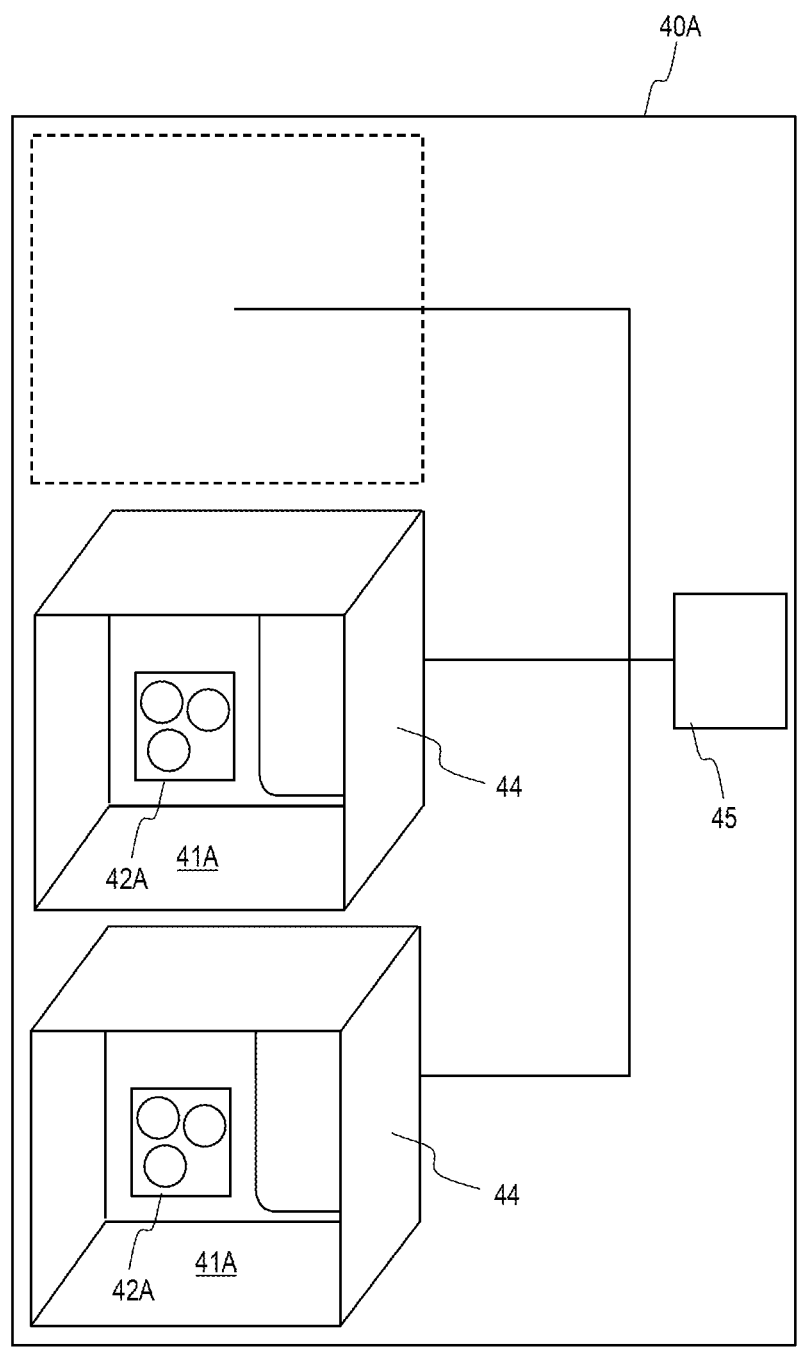
FIG. 12 shows one example of an outline of a residential section according to a modified example.

FIG. 12 shows one example of an outline of a residential section 40A according to a modified example. The residential section 40A is a tower-shaped section in which a plurality of entrances 41A can be arranged vertically. More specifically, in the residential section 40A, a plurality of accommodating units 44, including the entrance 41A and a connection unit 42A respectively, is vertically arranged. The residential section 40A is provided with a carrying device 45 for carrying the accommodating unit 44 to a vacant predetermined floor. Here, the accommodating unit 44 may have wheels, and the carrying device 45 may have, for example, a rail on which the wheels of the accommodating unit 44 can travel to a location at which the vehicle cabin unit is placed on each floor. Then, the carrying device 45 may carry the accommodating unit 44 along the rail by providing power to the wheels. Further, the residential section 40A includes the same facilities as those of the residential section 40. In addition, the residential section 40A includes an elevator that can move between the accommodating units 44 arranged on each floor.

When the vehicle 10 arrives at the residential section 40A, the entrance 41A on a first floor accommodates the vehicle 10. Then, the connection unit 37 of the vehicle 10 and the connection unit 42A of the residential section 40A are connected. In a case where the traveling unit 20 forming the vehicle 10 is used for another vehicle cabin unit, the traveling unit 20 is disconnected from the vehicle cabin unit 30. The accommodating unit 44 including the vehicle cabin unit 30 is carried by the carrying device 45 to, for example, a third floor. Therefore, a living space provision system 1A having such a residential section 40A can obtain the same effect as that of the first embodiment.

Other Modified Examples

In the living space provision system 1 described above, the facilities for supplying the tap water, the gas, and the electricity are shown as one of a plurality of examples of the infrastructure facility, but the living space provision system includes an infrastructure facility to treat sewage. In other words, a simple toilet having a sewage tank for storing the sewage may be installed in the vehicle cabin unit 30 and is connected to a residential section having a sewage pipe, thereby discharging the sewage from the sewage tank to the sewage pipe of the residential section 40. According to such a living space provision system, the user can continuously use the toilet in the vehicle cabin unit 30.

Moreover, although the passage 43 is provided in the residential section 40 forming the living space provision system 1 described above, the passage 43 may not be provided. Further, in the information processing apparatus 50 forming the living space provision system 1, the management unit 502 allocates the traveling unit to the vehicle cabin unit, but the processing of the management unit 502 to allocate the traveling unit to the vehicle cabin unit may not be necessary, and the traveling unit may not be shared. Moreover, the number of the connection units 42 provided in the residential section 40 is not limited to a particular number. In addition, the living space provision system 1 described above may not include the operation panel 36, and the electricity, the water or the gas may be automatically supplied from the residential section 40 to the vehicle cabin unit 30 in a case where the connector 32 of the vehicle cabin unit 30 and the connector 401 of the residential section 40 are connected.

The embodiments stated above are mere one of a plurality of examples, and the present disclosure can be implemented with appropriate modifications within a scope not departing from the gist thereof.

Moreover, the configurations and processing described in the present disclosure can be freely combined and implemented unless technical contradiction occurs.

Further, the processing described as being performed by a single device may be executed in a shared manner by a plurality of devices. Alternatively, the processing described as being performed by different devices may be executed by a single device. In the computer system, the hardware configuration (server configuration) for implementing each function can be flexibly changed.

The present disclosure can also be implemented by supplying a computer program for executing the functions described in the embodiments in a computer, and reading and executing the program by one or more processors included in the computer. Such a computer program may be provided to the computer by a non-transitory computer-readable storage medium connectable to a computer system bus, or may be provided to the computer via the network. Examples of the non-transitory computer-readable storage media include random disk (such as a magnetic disk (Floppy® disk, hard disk drive (HDD), and the like) or optical disk (CD-ROM, DVD disk, Blu-ray disk, and the like)), read-only memory (ROM), random access memory (RAM), EPROM, EEPROM, magnetic card, flash memory, optical card, and random types of medium suitable for storing electronic instructions.

What is claimed is:

1. A facility that provides an infrastructure service to vehicles, each of the vehicles including a first unit that includes a driving wheel and a second unit that has a cabin space of the vehicle and at least one of a tank and a gas cylinder and is separable from the first unit, the facility comprising:
   connection units each configured to connect to the second unit of one of the vehicles;
   a provision unit configured to provide at least one of water and gas to the at least one of the tank and the gas cylinder of the second unit of the one of the vehicles when at least one of the connection units is connected to the second unit of the one of the vehicles; and
   a passage configured to pass between the second units of the vehicles when at least two of the connection units are connected to the second units of the vehicles, so that a user can come and go between the second units of the vehicles through the passage.

2. The facility according to claim 1, wherein:
   the connection units are provided side by side.

3. The facility according to claim 1, further comprising:
   a control unit configured to accept a usage request including a usage period of the first unit from the second unit, and to allocate, to the second unit, a first unit which is separated from a third unit connected to the connection unit and which is available in the usage period, from among a plurality of first units.

4. The facility according to claim 1, further comprising:
   a provision control unit configured to control, when at least one of the connection units is connected to the second unit of the one of the vehicles, the provision unit such that the water or gas is provided to the second unit of the one of the vehicles,
   wherein the provision control unit includes a selection unit configured to select the water or gas that is continuously available.

5. A provision system comprising:
   vehicles; and
   a facility that provides an infrastructure service to the vehicles, wherein:
   each of the vehicles includes a first unit that includes a driving wheel and a second unit that has a cabin space of the vehicle and at least one of a tank and a gas cylinder and is separable from the first unit; and
   the facility includes connection units each configured to connect to the second unit of one of the vehicles;

a provision unit configured to provide at least one of water and gas to the at least one of the tank and the gas cylinder of the second unit of the one of the vehicles when at least one of the connection units is connected to the second unit of the one of the vehicles; and a passage configured to pass between the second units of the vehicles when at least two of the connection units are connected to the second units of the vehicles, so that a user can come and go between the second units of the vehicles through the passage.

6. The provision system according to claim 5, wherein: the connection units are provided side by side.

7. The provision system according to claim 5, wherein the facility further includes a control unit configured to accept a usage request, from the second unit, including a usage period of the first unit, and to allocate, to the second unit, a first unit which is separated from a third unit connected to the connection unit and which is available in the usage period, from among a plurality of first units.

8. The provision system according to claim 5, wherein:

the facility further includes a provision control unit configured to control, when at least one of the connection units is connected to the second unit of the one of the vehicles, the provision unit such that the water or gas is provided to the second unit of the one of the vehicles; and the provision control unit includes a selection unit configured to select the water or gas that is continuously available.

* * * * *